United States Patent
Krämer et al.

(10) Patent No.: US 6,187,098 B1
(45) Date of Patent: Feb. 13, 2001

(54) POWDER COATING CABIN

(75) Inventors: Erich Krämer; Matthias Krämer, both of Michelau (DE)

(73) Assignee: Nordson Corporation, Westlake, OH (US)

(*) Notice: Under 35 U.S.C. 154(b), the term of this patent shall be extended for 0 days.

(21) Appl. No.: 09/179,724

(22) Filed: Oct. 23, 1998

Related U.S. Application Data

(63) Continuation of application No. PCT/EP97/02066, filed on Apr. 23, 1997.

(30) Foreign Application Priority Data

Apr. 23, 1996 (DE) ............................................ 196 16 220

(51) Int. Cl.[7] ........................... B05B 15/04; B05C 19/04; B05C 19/06; B05D 1/06; B05D 3/00
(52) U.S. Cl. ........................ 118/326; 118/308; 118/309; 118/314; 427/472; 427/479; 427/301; 454/50
(58) Field of Search ......................... 118/326, 50, 58, 118/628, 715, 308, 309, 314; 454/50; 427/472, 474, 479, 301, 319, 328

(56) References Cited

U.S. PATENT DOCUMENTS

| | | | | |
|---|---|---|---|---|
| 1,068,864 | * | 7/1913 | Doering | 118/320 |
| 5,056,460 | * | 10/1991 | Vohringer | 118/634 |
| 5,690,995 | * | 11/1997 | Fischli et al. | 427/180 |
| 5,861,062 | * | 1/1999 | Reiss | 118/326 |

FOREIGN PATENT DOCUMENTS

| | | |
|---|---|---|
| 41 31 287 | 3/1993 | (DE). |
| 295 18 615 U | 1/1996 | (DE). |

* cited by examiner

Primary Examiner—Richard Crispino
Assistant Examiner—J. A. Lorengo
(74) Attorney, Agent, or Firm—Henry M. Feiereisen

(57) ABSTRACT

A powder coating cabin includes a column-like housing defining an interior space between a ceiling and a bottom, with the bottom being substantially of flat configuration, and a coating unit arranged on the housing for spraying powder onto an object. The powder coating unit is further provided with a cleaning unit which is so received in the housing as to be movable between a stand-by position in which the cleaning unit is arranged at least partially underneath the bottom and an operative phase for automatically cleaning at least the inner wall surfaces of the housing, whereby the bottom is suitably so designed as to clear a passage for the cleaning unit.

85 Claims, 9 Drawing Sheets

POWDER COATING CABIN

CROSS-REFERENCES TO RELATED APPLICATIONS

This application is a continuation of prior filed copending PCT International application no. PCT/EP97/02066, filed Apr. 23, 1997.

This application claims the priority of German Patent Application, Serial No. 196 16 220.3, filed Apr. 23, 1996, the subject matter of which is incorporated herein by reference.

BACKGROUND OF THE INVENTION

The present invention relates to a powder coating cabin, and in particular to a powder coating cabin of column-shaped design and of a type including a housing having a cabin ceiling and a cabin bottom, and a coating unit arranged on the housing for spraying powder onto an object.

In the field of powder coating, that need for a frequent change of paint is more and more demanded so that the cleaning of powder coating cabins becomes increasingly important. In this context, reference is made to commonly owned copending international patent application PCT/EP 95/04115, the disclosure of which is incorporated herein by reference, which discloses configurations of powder coating cabins which may have door-shaped gates for defining pre-coating and final coating sites and, possibly, have a closeable bore for passage of powder spray coating devices. Further disclosed in the above-referred international patent application are various embodiments of cleaning units for effecting a simplified purging of the interior space of the housing by use of compressed air and/or suction air and/or wet cleaning elements. The cleaning unit is movable in vertical direction, i.e. in vertical direction of the housing, to clean the inner wall surfaces of the housing when the housing is closed and forms a closed container. The cleaning unit is moved into the operative cleaning phase through the ceiling or laterally by opening the door-shaped gates for formation of the pre-coating and/or final coating sites. After closing the doors and the slots, the cleaning unit can be operated to carry out a cleaning of the inner wall surfaces of the housing. Practice has shown however that sufficient backup space must be provided laterally or above outside the housing for arrangement of the cleaning unit in the stand-by position so that the manner of loading and operating the powder coating cabin is restricted. In addition, there is also a risk of contamination of the cleaning unit in the stand-by position. In particular powder particles may remain on the cleaning unit, resulting in a risk of encountering undesired powder mixtures. Cleansing of the cleaning unit itself is relatively cumbersome and requires mostly manual labor.

SUMMARY OF THE INVENTION

It is thus an object of the present invention to provide an improved powder coating cabin, obviating the afore-stated drawbacks.

In particular, it is an object of the present invention to provide an improved powder coating cabin which is of compact configuration.

It is still another object of the present invention to provide an improved powder coating cabin which allows a fully automatic cleaning of the interior housing space in a space-saving manner and allows an automatic purification of the automatic cleaning unit itself.

These objects, and others which will become apparent hereinafter, are attained in accordance with the present invention by providing a column-like housing defining an interior space between a ceiling and a bottom, with the bottom being substantially of flat configuration, and a coating unit for spraying powder onto an object. Preferably, the powder coating unit is further provided with a cleaning unit which is so received in the housing as to be movable between a stand-by position in which the cleaning unit is arranged at least partially underneath the bottom and an operative phase for automatically cleaning at least the inner wall surfaces of the housing, whereby the bottom is suitably so designed as to clear a passage for the cleaning unit.

As a result of the flat configuration of the cabin bottom, the housing of the powder coating cabin according to the present invention can be so designed as to exploit an area underneath the bottom for accommodation of the cleaning unit in the stand-by position, while yet being prevented from interfering with the entry of the object being coated and the operation of the powder coating cabin so that the risk of damaging the cleaning unit as well as its susceptibility to contamination are significantly reduced. By opening and closing the bottom of the housing, the cleaning unit housed underneath the bottom in stand-by position can be used to realize a cleaning operation of the interior space of the housing by entering the interior space from below. After closing the bottom, the cleaning operation can be carried out. The coating process thus is not adversely affected even when carrying out the coating operation in a continuous fashion.

According to another feature of the present invention, the cleaning unit is so designed as to be adjustable in a vertical direction of the housing for automatically cleaning at least the inside wall surfaces of the housing. The coating unit includes a spray coating device which projects into the interior space through at least one bore in the housing, a pre-coating site secured to the housing and having a gate mechanism movable between a first position in which access to the interior space is closed and a second position in which access to the interior space is open to allow pre-coating of the object, and a final coating site secured to the housing and having a gate mechanism movable between a first position in which access to the interior space is closed and a second position in which access to the interior space is open to allow final coating of the object.

Preferably, the cleaning unit has at least one scavenger arm adapted to sweep over the bottom during operation of the coating unit, and a cleaning member adapted for cleaning the inside wall surfaces of the interior space. The scavenger arm may be provided with scrapers such as scraping lips and/or blow nozzles. The blow nozzles may be so aligned as to point laterally in direction towards the housing wall, and blow nozzles may be provided which point upwardly for cleaning the cabin ceiling during cleaning operation. The scavenger arm can sweep the bottom also during coating operation and transport powder accumulating on the bottom or in vicinity thereto, even during coating operation, to associated exhaust systems so that this powder can be recovered and returned into the powder cycle without stoppage of the powder coating cabin, resulting in an efficient and powder-saving operation. During cleaning operation, the scavenger arm in conjunction with the respectively arranged blow nozzles can be used for cleaning the ceiling when elevating the cleaning unit inside the housing towards the cabin ceiling. Suitably, when the ceiling is formed with a slotted opening for allowing entry and continuous advance of a suspended object to be coated into the powder coating cabin, the cleaning unit is suitably provided with an outwardly projecting strip-like bar which closes the slotted opening during cleaning operation.

Preferably, the cleaning unit is able to spin about a substantially vertical axis to realize an extremely efficient cleaning of the interior space, including possibly formed slots. Moreover, this spinning motion of the cleaning unit can also advantageously be exploited when carrying out a purification of the cleaning unit in the stand-by position inside a cleansing compartment formed underneath the bottom of the housing.

According to another feature of the present invention, the housing has at least one slit extending longitudinally along a vertical extension of the housing between the ceiling and the bottom, with at least one exhaust duct being connected to the interior space of the housing via the slit. Preferably, the housing has two such slits extending longitudinally along a vertical extension of the housing in diametrically opposite disposition, with two such exhaust ducts arranged in diametrically opposite disposition, adjacent pre-coating and final coating sites, if provided, whereby one of the exhaust ducts is connected to the interior space of the housing via one of the slits, and the other one of the exhaust ducts is connected to the interior space of the housing via the other one of the slits. When providing door-shaped gates on the inlet side and outlet side of the housing which can be opened to enable a manual pre-coating and/or final coating, excess powder can be transferred into an exhaust duct positioned opposite thereto in close proximity so that pre-coating and/or final coating processes, frequently carried out by hand, can be realized in a powder-saving and economical manner without any significant impact on the automatic operation. Suitably, each slit has a width which decreases from the bottom in direction to the ceiling to realize an efficient discharge via the exhaust ducts.

According to another feature of the present invention, the cleaning unit has an auxiliary device for automatically cleaning the exhaust ducts during the cleaning operation of the housing. Thus, the exhaust ducts can be automatically cleaned during a cleaning cycle of the powder coating cabin during advance of the cleaning unit in the vertical direction of the housing. The auxiliary device for automatically cleaning the exhaust ducts is preferably connected directly with the cleaning unit in the interior space of the housing so as to permit the use of a common supply and drive as well as guide mechanisms for the entire cleaning unit including the auxiliary device. Additionally, the auxiliary device of the cleaning unit may also effect a guidance of the cleaning unit during movement within the housing in conjunction with the exhaust ducts.

Preferably, the exhaust ducts are connected to a cyclone, preferably at formation of an acceleration path downstream of an inlet port of the cyclone. In this manner, relatively large powder amounts accumulating during cleaning operation can be easily treated in the powder acceleration path before entering the cyclone through the inlet so as to enable a trouble-free continuous operation of the cyclone.

According to another feature of the present invention, the housing has a cleansing compartment underneath the bottom for accommodating the cleaning unit in the stand-by position and allowing a cleansing of the cleaning unit. The cleansing compartment may be provided with air supply conduits and exhaust air conduits, with a fan realizing supply of a large amount of air through the air supply conduit into the cleansing compartment. Optionally, exhaust air exiting the cyclone through an outlet may be fed into the air supply conduit, with a filter being positioned downstream of the cyclone outlet.

Preferably, the cleaning unit including the scavenger arm and the optionally provided auxiliary device for cleaning the exhaust ducts can be arranged in its entirety within the cleansing compartment. The cleansing compartment formed underneath the bottom is closed so as to allow an automatic purification of the cleaning unit, even during coating operation so that a cleansing of the cleaning unit can be carried out without interrupting the powder coating operation. This significantly increases the efficiency of the powder coating cabin. The additional cleansing of the cleaning unit further reduces the risks of powder mixtures during change of paint because the self-cleaning action of the cleaning unit results in a removal of almost all attached powder.

As this self cleaning action can also be carried out automatically, a complete cleaning can be accomplished in an economical manner without manual work and without any risk of powder mixtures. Cleansing of the cleaning unit can be executed during resumption of the coating operation so that the throughput of the powder coating cabin is increased in synergistic fashion for the powder coating operation, and a nearly complete purifying of the cleaning unit is effected.

Preferably, a suction effect is provided in the area of the ceiling especially during cleaning of the interior space of the housing. The suction effect is realized via an annular gap which fluidly connects the interior space of the cabin housing with an exhaust system when the slotted opening formed in the ceiling for allowing entry into and continuous advance of an overhead transported object through the housing is closed. Alternatively, the suction effect can also be accomplished via the slotted opening when the fluid connection between the exhaust system and the interior space of the cabin housing is effected by the slotted opening. Thus, a reliable cleaning action is attained also in the transitions zones between the longitudinal housing walls and the ceiling of the cabin.

Opening of the cabin bottom to allow passage of the cleaning unit can be accomplished in various ways. According to one variation, the bottom is of split configuration and formed by two bottom portions which are capable of traveling apart from one another to open the bottom and to thereby allow passage of the cleaning unit for carrying out a cleaning of the inside wall surfaces of the housing. Alternatively, the bottom may be of single-piece configuration and adapted for withdrawal in its entirety to allow passage of the cleaning unit for carrying out cleaning of the inside wall surfaces of the interior space. According to still another embodiment, the bottom is formed as rotary bottom so as to be rotatable about a substantially horizontal axis or at least pivotable by about 180°.

Suitably, the cleaning unit may be supported by the cabin bottom, e.g. when formed as rotary bottom, and thus may be movable in vertical direction of the housing during cleaning of the interior space. Thus, the bottom can also be utilized as carrier for the cleaning unit and moved during cleaning operation. For cleansing of the cleaning unit in the stand-by position, the bottom is rotated into such a position that the subjacent cleansing compartment is tightly sealed to allow a purging of the cleaning unit in the stand-by position within the cleansing compartment.

According to another feature of the present invention, the cleaning unit for the interior space of the housing can be moved independently from the rotary bottom in vertical direction of the housing, whereby the scavenger arm of the cleaning unit for sweeping over the bottom also during the stand-by position can be exploited in the cleaning position of the rotary bottom to purge the bottom in the area of the cleansing compartment and also to clean the scavenger arm itself while the cleaning unit for the interior space can be moved independently in vertical direction of the housing.

Preferably, height adjustment of the cleaning unit between the bottom and the ceiling of the housing is effected by a displacement device which is mounted externally onto the housing or externally onto one of the gate mechanisms. The displacement device may be operatively connected to the cleaning unit via a gap formed in the one gate mechanism or through the bore for passage of the spray coating device.

According to another feature of the present invention, the cleaning unit is of ring-shaped configuration, and includes scraper members, blow nozzles, brushes, sponges and wet cleaning units. A particular configuration of the cleaning unit depends on the concrete application and can be suited to the intended use.

Preferably, at least two powder coating cabins are interconnected and arranged in succession, with each powder coating cabin being equipped with a separate cleaning unit. Suitably, a common displacement device is provided for vertically moving the cleaning units of the powder coating cabins. Configuration of the cleaning unit in this manner enables an efficient and simultaneous cleaning operation of both adjoining powder coating cabins, whereby the powder coating cabins may have different or same internal dimensions.

According to another feature of the present invention, the cleaning units of the powder coating cabins may be securely linked to one another in a transition zone between both powder coating cabins so that both cleaning units form a singular unit. In this design, it is sufficient to have each cleaning unit interact with an associated vertical displacement device so that each powder coating cabin can, for example, be associated to only one vertical displacement device which in cooperation with the other vertical displacement device in the other powder coating cabin moves the singular unit of cleaning units of both powder coating cabins in vertical direction of the housing.

A relevant aspect of the powder coating cabin according to the present invention resides in the configuration of a flat bottom of the housing. The bottom can suitably be opened to allow passage of the cleaning unit which is at least partially accommodated underneath the bottom in stand-by position. The provision of a flat bottom allows an efficient exploitation of space, and offers the possibility for an automated purging of the cleaning unit itself in a simple manner inside the cleansing compartment formed underneath the bottom.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
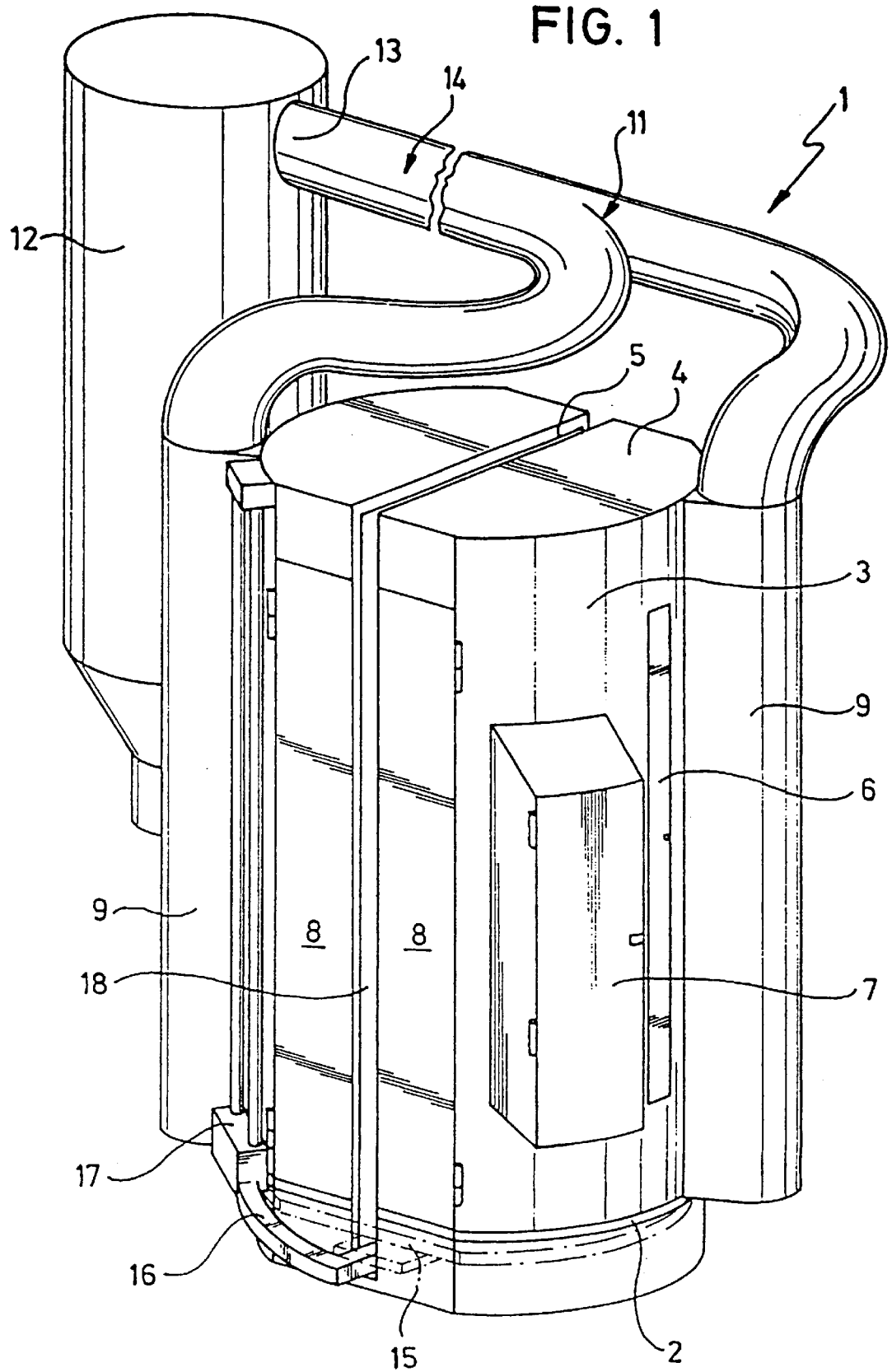
FIG. 1 is a schematic, perspective overall view of a powder coating cabin according to the present invention.

Throughout all the Figures, same or corresponding elements are generally indicated by same reference numerals.

Turning now to the drawing, and in particular to FIG. 1, there is shown a schematic, perspective overall view of a powder coating cabin according to the present invention, generally designated by reference numeral 1. A specific construction and manner of operation of a powder coating cabin of this general type is fully described in commonly owned copending international patent application PCT/EP 95/04115, the entire specification and drawings of which are expressly incorporated herein by reference.

Figure 10:
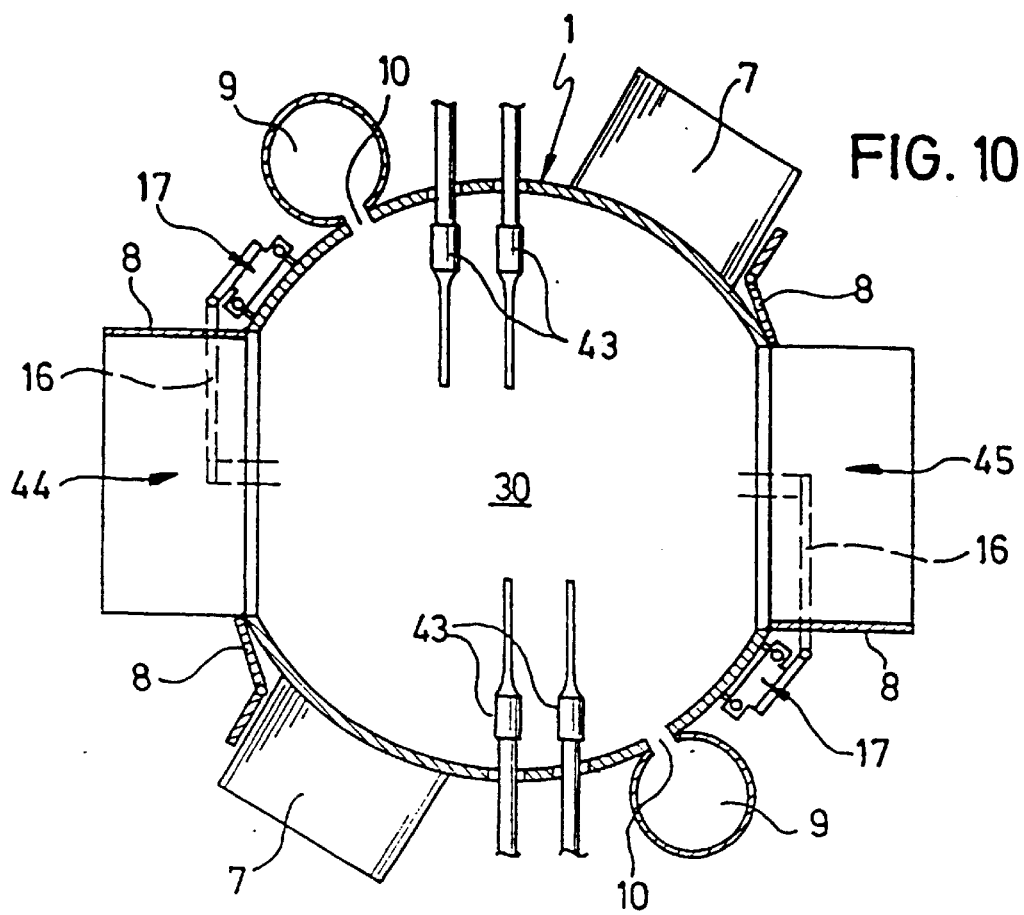
FIG. 10 is a schematic, partially sectional top plan view of a powder coating cabin according to the present invention, equipped with a first variation of a displacement device.
Figure 11:
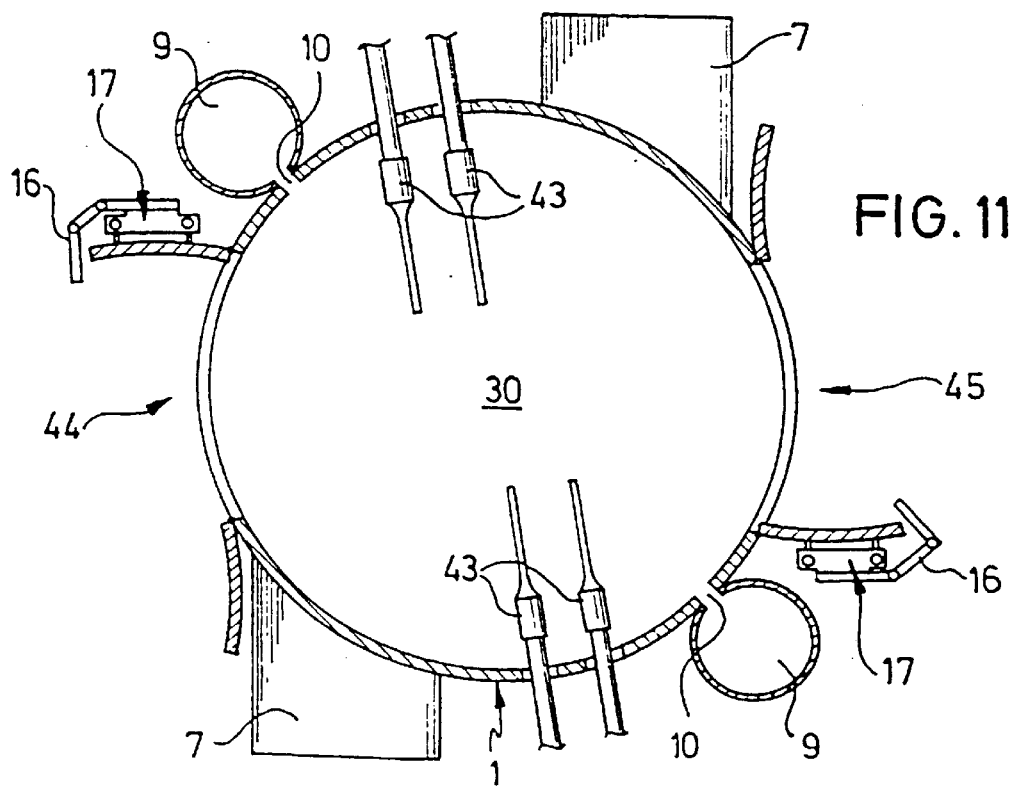
FIG. 11 is a schematic, partially sectional top plan view of a powder coating cabin according to the present invention, equipped with a second variation of a displacement device.

The powder coating cabin 1 has a column-shaped housing 3 formed with a flat bottom 2 and a ceiling 4. The ceiling 4 is provided e.g. with a slotted opening 5 for entry and continuous advance of an overhead transported mount (not shown) for carrying objects to be coated. In FIG. 1, the powder coating cabin 1 is shown in a closed state for carrying out, for example, a cleaning operation of the inner wall surfaces of the housing 3. Reference numeral 6 denotes a flap in its closed position for closing a slot which is not shown in detail for allowing passage of powder spray coating devices 43 (cf. FIG. 10), so-called guns, for spray coating operation. Reference numeral 7 denotes a central powder preparation and supply unit. Reference 8 denotes door-shaped gates which may also be provided on the opposite housing side (invisible in FIG. 1) of the powder coating cabin 1. When at least partially opened, the door-shaped gates 8 allow the formation of a pre-coating site and final coating site so that an operator can use hand tools to apply a spray coat on the object for a pre-treatment and/or final treatment. Mounted externally to the outer surface area of the housing 3 are, for example, two exhaust ducts 9 which, as shown in FIGS. 10 and 11, are in communication with the interior space of the housing 3 via a longitudinal slit 10 extending vertically between the ceiling 4 and the bottom 2. Although not shown in detail, the longitudinal slit 10 has a width which decreases in the direction from the cabin bottom 2 to the cabin ceiling 4. As further shown in FIG. 1, the exhaust ducts 9 and thus also the longitudinal slits 10 oppose each other approximately diametrically and adjacent to the door-shaped gates 8. Preferably, the configuration is so selected that the exhaust ducts 9 of e.g. a hand coating machine, approximately oppose one another when the door-shaped gates 8 are for example so opened as to form a pre-coating site or final coating site. In this context, reference is made to the above-mentioned international application PCT/EP 95/04115 which shows these respective positions. The exhaust ducts 9 are preferably connected via a duct system 11 with a cyclone 12 in order to form in flow direction towards the inlet port 13 of the cyclone 12 an acceleration path 14 which is not shown in more detail for sake of simplicity.

As schematically indicated in FIG. 1, a cleaning unit 15 is arranged in its stand-by position underneath the essentially flat bottom 2 and cooperates via a bar linkage 16 with a displacement device 17 which moves the cleaning unit 15 between the cabin bottom 2 and the cabin ceiling 4 in a vertical direction so that the cleaning unit 15 cab carrying out a cleaning operation of the interior space of the housing 3 of the powder coating cabin 1. The displacement device 17 may be designed in any suitable manner, for example in the form of a rope drive, spindle drive, chain drive or the like. In the non-limiting example of FIG. 1, the displacement device 17 is mounted to a stationary outside surface of the housing 3 of the powder coating cabin 1. The bar linkage 16 projects through a gap 18 formed between the door-shaped gates 8 when being closed in order to provide a connection of the displacement device 17 with the cleaning unit 15.

Figure 2:
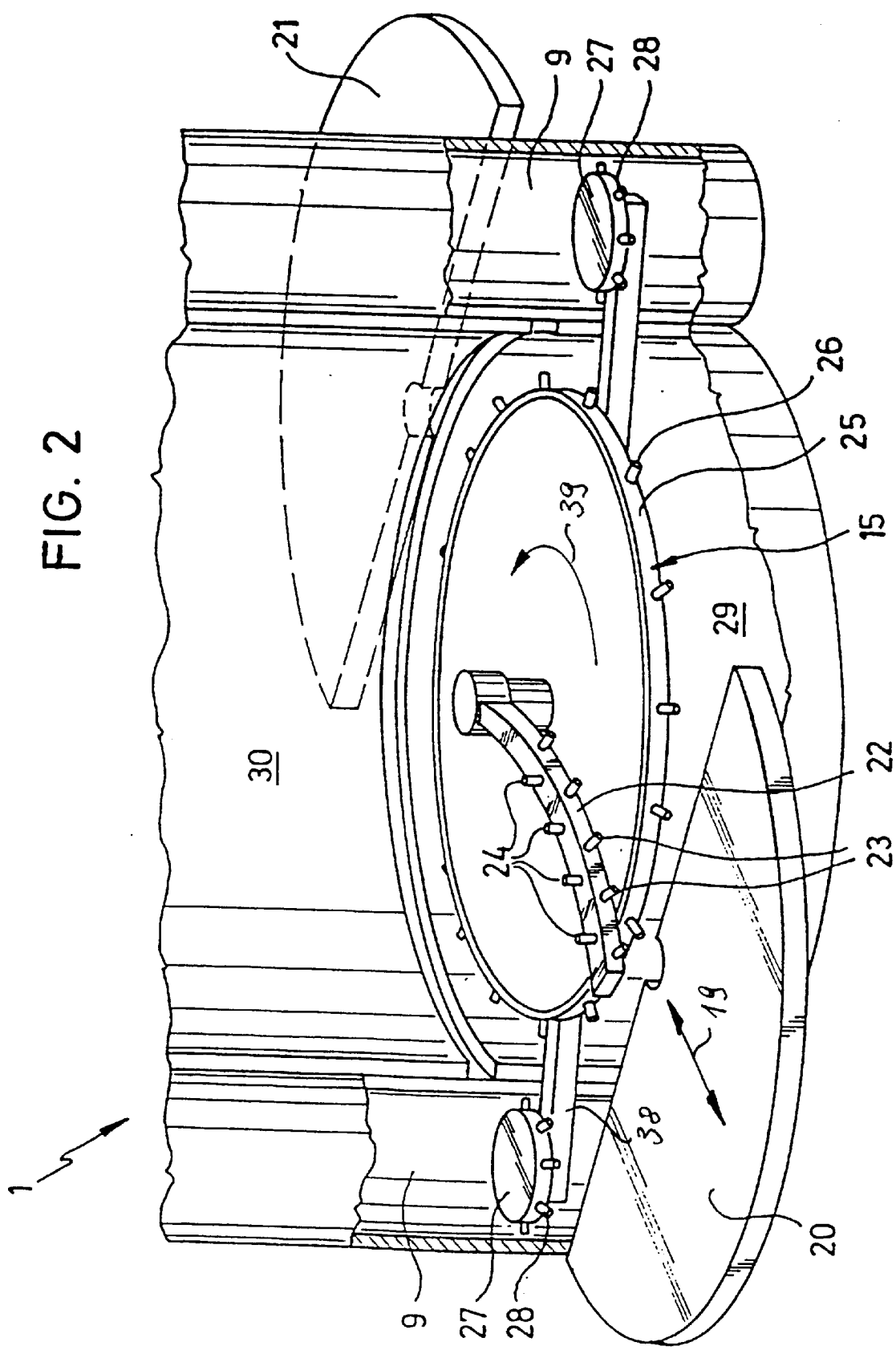
FIG. 2 is a cutaway view, in perspective illustration, of the powder coating cabin in the bottom zone, showing a first embodiment of a cleaning unit.

Referring now to FIG. 2, there is shown a first embodiment of a cleaning unit 15 in conjunction with a first configuration of the substantially flat bottom 2. In this configuration, the substantially flat bottom 2 is split and is formed by two bottom portions 20, 21. As indicated by double arrow 19, the bottom portions 20, 21 can be moved relative to one another so that the bottom 2 can be completely opened to clear a passage for the cleaning unit 15. In the exemplified illustration of FIG. 2, the bottom portions 20, 21 are almost fully moved apart in order to be able to show particulars of the cleaning unit 15. The cleaning unit 15 includes, for example, a scavenger arm 22 which continuously sweeps over the bottom 2 also when the bottom 2 is closed and during coating operation. The scavenger arm 22 is provided with not shown scraper elements, such as a scraper lip. Moreover, the scavenger arm 22 is formed with laterally directed blow nozzles 23 and upwardly pointed blow nozzles 24. In particular, by means of the laterally directed blow nozzles 23, powder scraped from the bottom 2 during coating operation is transported in the direction towards the side walls of the housing 3 as well as to the exhaust ducts 9 so that excessive powder accumulating on the bottom 2 can be returned to the powder preparation and supply cycle to thereby realize an efficient coating operation by saving powder material.

The cleaning unit 15 further includes a preferable disk-shaped platform or base body 25 which is suitably formed as hollow annular conduit and is provided with blow nozzles 26. Auxiliary members 27 are additionally mounted in the area of the exhaust ducts 9 to the platform 25 via connecting rods 38 and equipped with blow nozzles 28. These auxiliary members 27 provide a simultaneous purging of the exhaust ducts 9 during a cleaning operation of the powder coating cabin 1. The cleaning unit 15 may spin about a substantially vertical axis, as indicated in FIG. 2 by arrow 39. Persons skilled in the art will appreciate that the cleaning unit 15 must certainly include a suitable drive mechanism for effecting a rotational motion. This drive mechanism is, however, not shown in the drawings for sake of simplicity.

Figure 3:
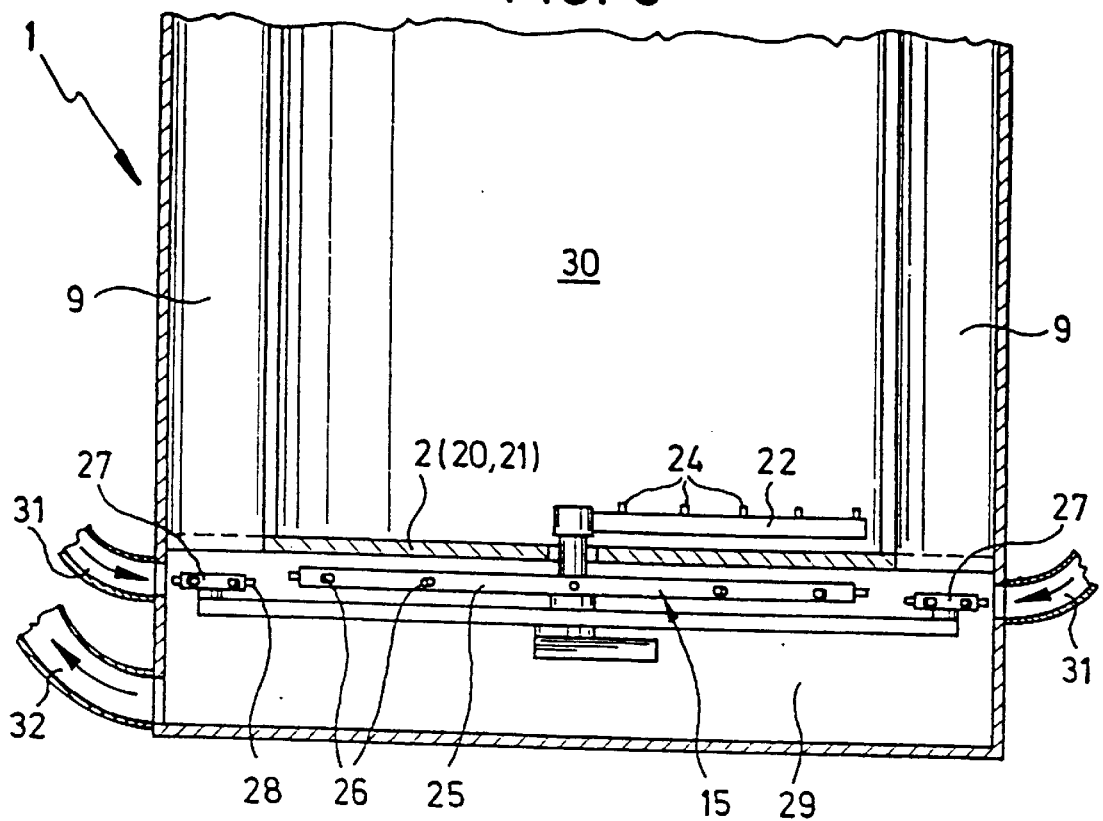
FIG. 3 is a partially sectional cutaway view of the cleaning unit of FIG. 2 in a stand-by position.

When both bottom portions 20,21 of the substantially flat bottom 2 closely adjoin one another, an enclosed cleansing compartment 29 is formed underneath the bottom 2 for accommodating at least the disk-shaped platform 25 with the auxiliary members 27 in a stand-by position during the coating operation while the scavenger arm 22 is disposed above the bottom 2 inside the interior space 30 of the housing 3, as shown in FIG. 3, to effect a continuous cleaning of the bottom 2 even during the spray coating operation.

Turning now in particular to FIG. 3, there is shown a partially sectional cutaway view of the cleaning unit 15 of FIG. 2 in the stand-by position in which the bottom 2 is closed and the scavenger armed 22 projects into the interior space 30 of the housing 3. The disk shaped platform 25 and the auxiliary members 27 are arranged in the tightly closed compartment 29. Communicating with the compartment 29 are conduits 31 for supply of air and an outlet conduit 32 positioned in proximity of the base of the compartment 29. The air supply conduits 31 are so dimensioned that large quantities of air can be introduced into the compartment 29 within a short period. Optionally, exhaust air of the cyclone 12 can be exploited for introduction via the air supply conduits 31 into the compartment 29 through provision of a fan (not shown) and a suitably interposed filter (not shown). In the stand-by position shown in FIG. 3, the cleaning unit 15 is able to spin about its substantially vertical axis. Thus, the cleaning unit 15 can be purged in this compartment 29 during renewed coating operation in the interior space 30 of the housing 3. Hence, the cleaning unit 15 can be continuously cleansed even after cleaning the interior space 30 has taken place so that powder mixtures, in particular during change of paint, can reliably be eliminated. The outlet conduit 32 may then also be connected via the exhaust side to a powder recovery system.

Figure 4:
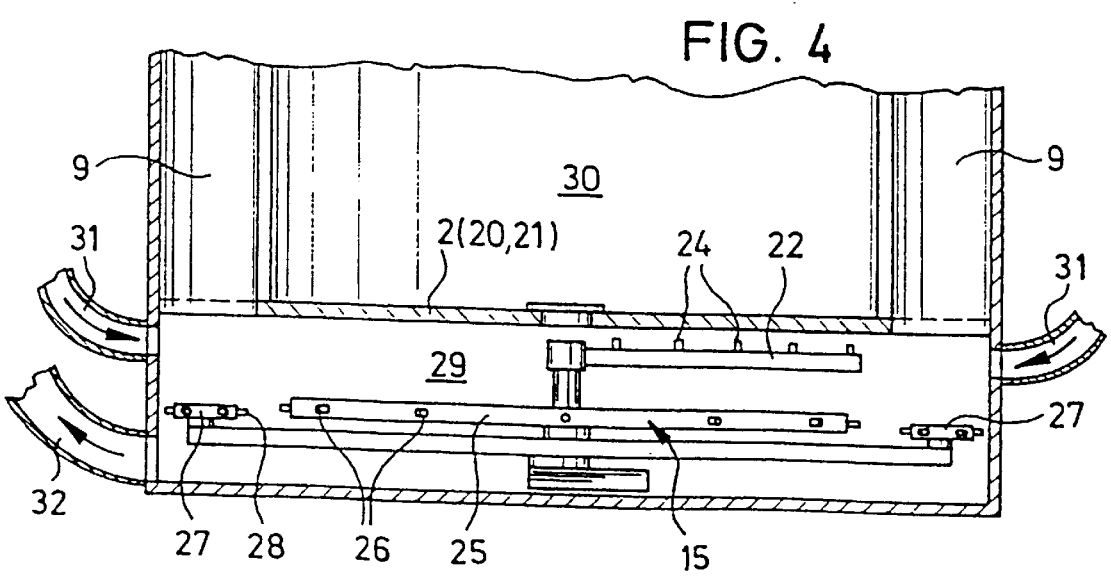
FIG. 4 is a partially sectional view, similar to FIG. 3, of the cleaning unit in a self-cleansing position inside a cleansing compartment.

FIG. 4 shows the entire cleaning unit 15 with the scavenger arm 22 inside the compartment 29 for executing a purifying thereof, with the opening formed in the bottom 2 for passage of the scavenger arm 22 being tightly closed.

Figure 5:
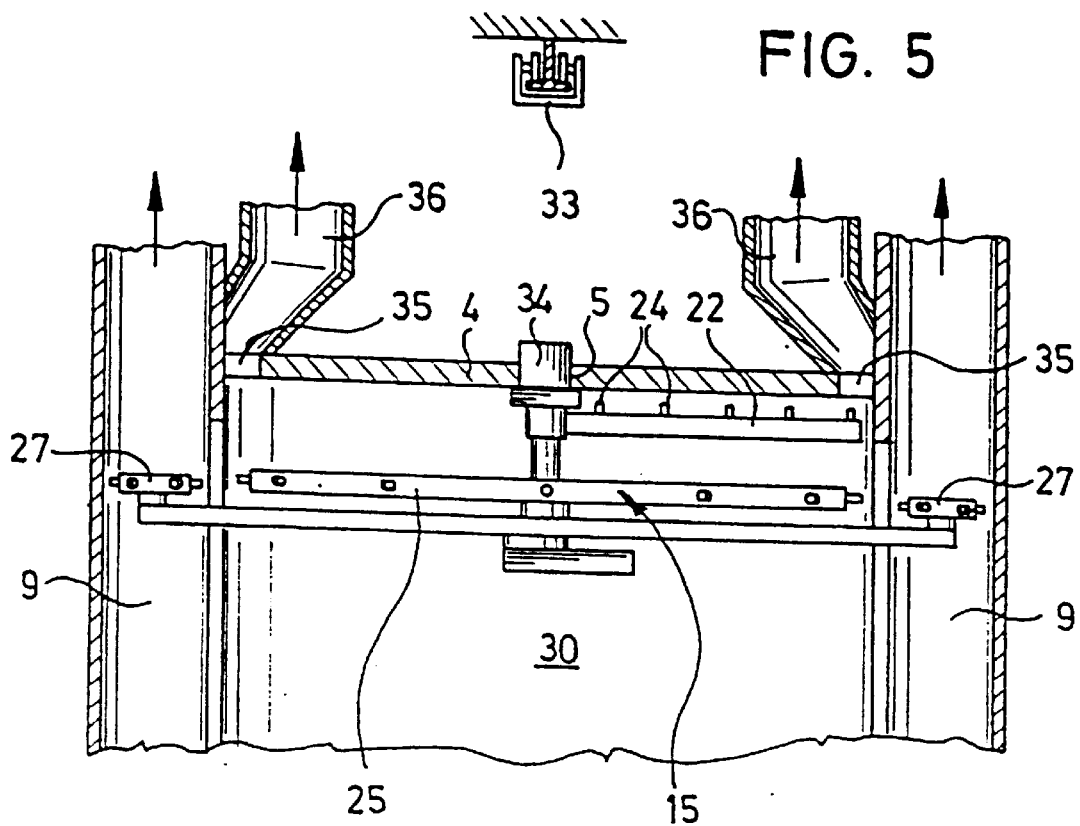
FIG. 5 is a partially sectional cutaway view of the powder coating cabin of FIG. 1 in the ceiling zone.
Figure 6:
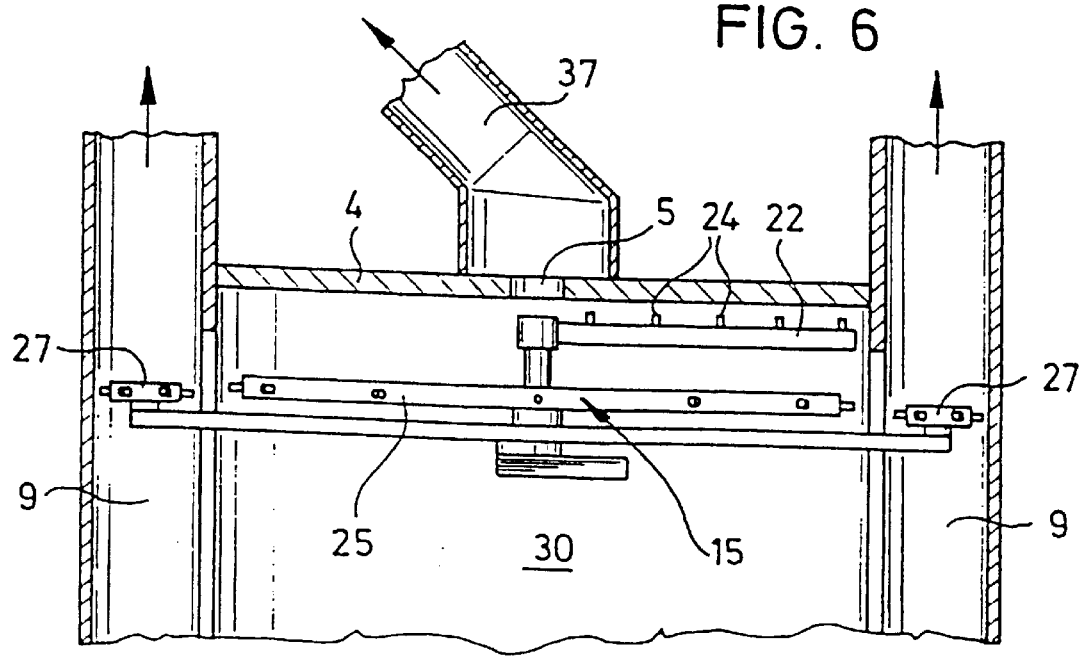
FIG. 6 is a partially sectional view of the powder coating cabin with a modified ceiling zone.

Referring now to FIG. 5, there is shown a partially sectional cutaway view of the powder coating cabin of FIG. 1 in the area of the cabin ceiling 4. Schematically indicated in FIG. 5 is a chain conveyor 33 for attachment of an overhead mount (not shown) from which objects to be coated are suspended and advanced through the slotted opening 5 (see FIG. 1) for a continuous coating operation. The cleaning unit 15 is moved to its upper cleaning position by means of the displacement device 17. A bar 34 which, for example, is secured to the cleaning unit 15 seals the slotted opening 5 during advance of the overhead mount. The cabin ceiling 4 is formed with an annular gap 35 which is connected to an associated exhaust pipe 36. The exhaust may also be realized via the slotted opening 5 in the cabin ceiling 4, as shown in FIG. 6, with an exhaust pipe 37 being secured to the interior space distant side of the cabin ceiling 4 in the area of the slotted opening 5. As shown in FIGS. 5 and 6, the nozzles 24 projecting out from the top side of the scavenger arm 22 effect at the same time a cleaning of the cabin ceiling 4 to clear them from any powder particles. The removal of powder particles is then realized via the exhaust pipe 36 according to FIG. 5, or via the exhaust pipe 37 according to FIG. 6. The exhaust pipe 36 or exhaust pipe 37 may also be connected via respective pipelines to a powder recovery system (not shown).

It will be appreciated by persons skilled in the art that the cleaning unit 15 may contain much additional mechanical apparatus which does not appear in the foregoing Figures, e.g. scraper elements, blow nozzles, brushes, sponges and/or wet cleaning systems. However, this apparatus, like much other necessary apparatus, is not part of the invention, and has been omitted from the Figures for the sake of simplicity.

The powder coating cabin 1 operates as follows: During coating operation, the scavenger arm 22 of the cleaning unit 15, as described above, is able to sweep over the flat bottom 2 to thereby remove powder particles from the bottom 2 during spray coating operation and transport them in direction to the exhaust ducts 9.

When, for example upon a change of paint, the powder coating cabin 1 is cleaned by closing the respective gates 8, when provided, so that the interior space 30 of the housing 3 forms a closed container. The bottom 2 is opened, for example, as shown in FIG. 2 by moving apart the bottom portions 20, 21. In the event of a single-piece configuration, the bottom 2 is configured to shift completely sideways so as to allow the cleaning unit 15 to be moved by the displacement device 17 from its stand-by position underneath the bottom 2 into the operative cleaning phase. The bottom 2 is closed again, after the cleaning unit 15 has exited the compartment 29, and the cleaning unit 15 is moved by the displacement device 17 in direction towards the cabin ceiling 4 whereby the exhaust ducts 9 are purged at the same time. During displacement of the cleaning unit 15 in vertical direction, the disk-shaped platform 25 may spin about a substantially vertical axis. When reaching the cleaning phase shown in FIGS. 5 or 6, the cleaning unit 15 carries out an additional purging of the cabin ceiling 4, with the upwardly facing nozzles 24 of the scavenger arm 22 which point directly towards the cabin ceiling 4 for blowing off any particles. Subsequently, the cleaning unit 15 is lowered by the displacement device 17 in the direction towards the cabin bottom 2. As shown in FIG. 4, at the end of this downward movement, the cleaning unit 15 together with the scavenger arm 22 is positioned in the compartment 29 in which the cleaning unit 15 is cleansed after the bottom 2 has been tightly closed. Then, the cleaning unit 15 is moved into the stand-by position shown in FIG. 3 so that the scavenger arm 22 is able to sweep over the closed bottom 2. At this point, the powder coating operation may resume. Even during powder coating operation, the cleaning unit 15 may be further purged inside the compartment 29, if need be, so that the cleansing of relevant components of the cleaning unit 15 can be carried out also during the powder coating operation. Thus, not only is it possible to provide a fully automated cleaning of the interior space 30 of the housing 1 but also an efficient and complete cleansing of the cleaning unit 15 is accomplished in an automatic manner. It is certainly possible to move the cleaning unit 15 repeatedly upwardly and downwardly by means of the displacement devise 17 before attending to the purifying of the cleaning unit 15 inside the compartment 29.

Figure 7:
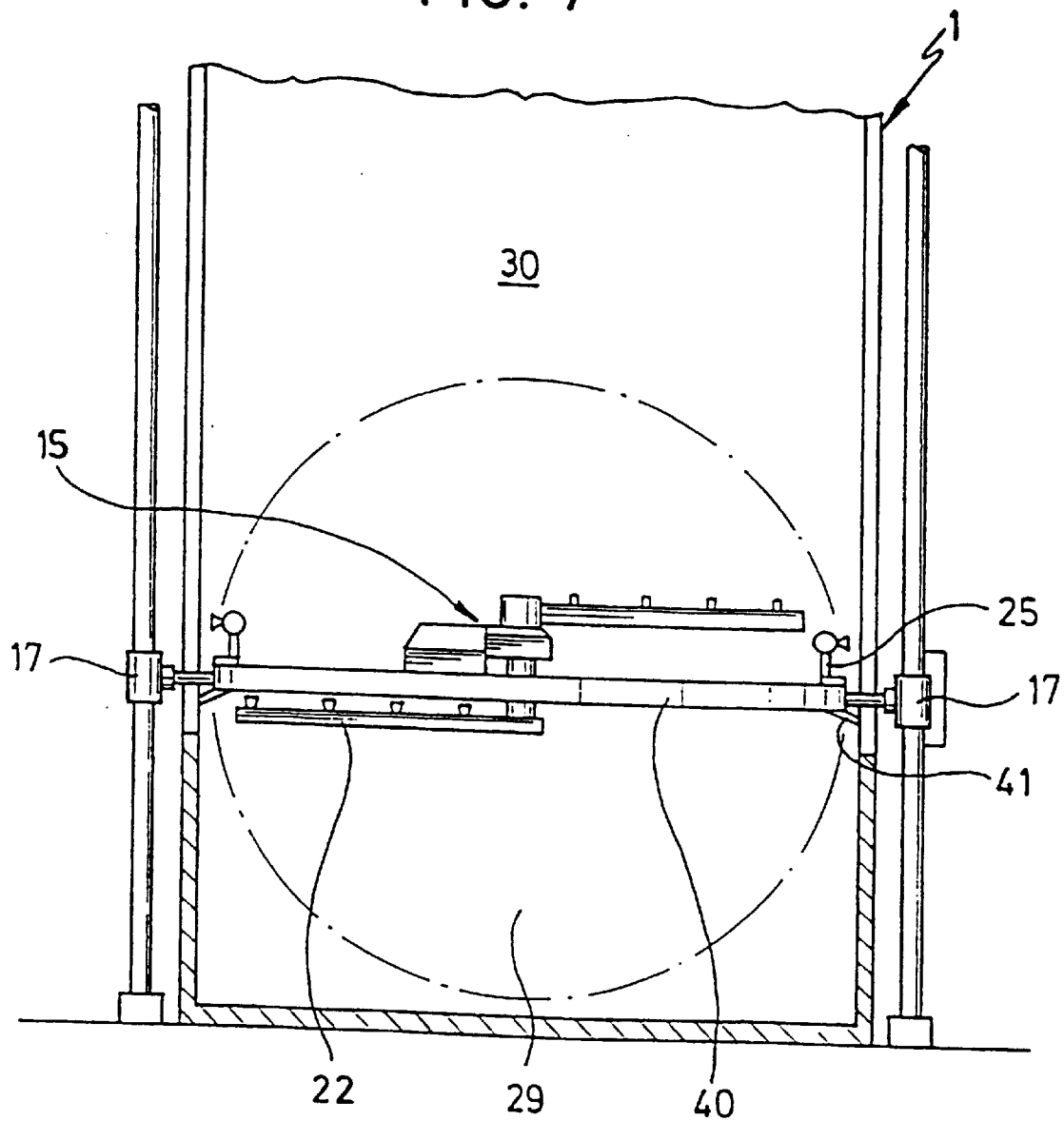
FIG. 7 is a schematic partially sectional view of another embodiment of a powder coating cabin according to the present invention, equipped with a rotary bottom.

Turning now to FIG. 7, there is shown a schematic partially sectional view of another embodiment of a powder coating cabin 1 according to the present invention, which differs from the previous embodiments in the configuration of the bottom. As shown in FIG. 7, the flat bottom is formed by a rotary bottom 40 which is rotatable about a substantially horizontal axis or at least is swingable by up to 180°. Schematically illustrated seals 41 provide a tight seal of the rotary bottom 40 with the longitudinal walls of the housing 3 of the powder coating cabin 1. The rotary bottom 40 serves simultaneously as carrier for a cleaning unit 15 which is of the similar configuration as the cleaning unit 15 of FIGS. 1 to 6. In FIG. 7, the rotary bottom 40 is shown in the cleansing phase of the cleaning unit 15 so that the scavenger arm 22 is positioned in the compartment 29. Thus, the bottom surface of the rotary bottom 40, facing the interior space 30 of the housing 3 during spray coating operation, can be cleansed. The components of the cleaning unit 15, provided for effecting a cleaning of the interior space 30 of the housing 3, are mounted to the top side of the rotary bottom 40. The rotary bottom 40 together with the cleaning unit 15 is moved by the schematically illustrated displacement device 17 in a vertical direction through the housing 3. Cleaning of the interior space 30 is effected in the same or similar manner as described above. After conclusion of the cleaning operation of the interior space 30, the rotary bottom 40 is returned to the base position, with the components of the cleaning unit 15, arranged above the rotary bottom 40, pointing downwards and arranged in the stand-by position of the cleaning unit 15. While spray coating operation resumes, the cleaning unit 15 can be cleaned inside the compartment 29.

Figure 8:
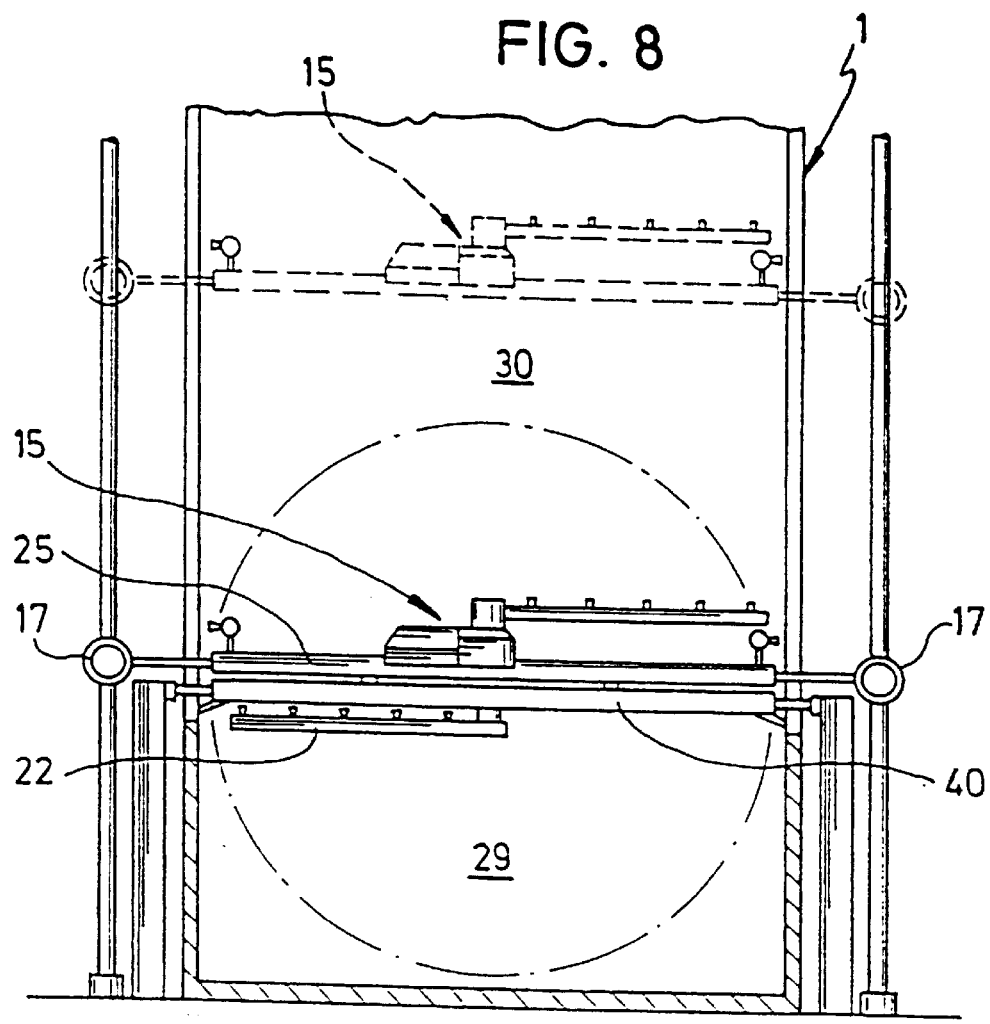
FIGS. 8 and 9 show schematic, partially sectional views of a rotary bottom and cleaning unit for a powder coating cabin according to the present invention.
Figure 9:
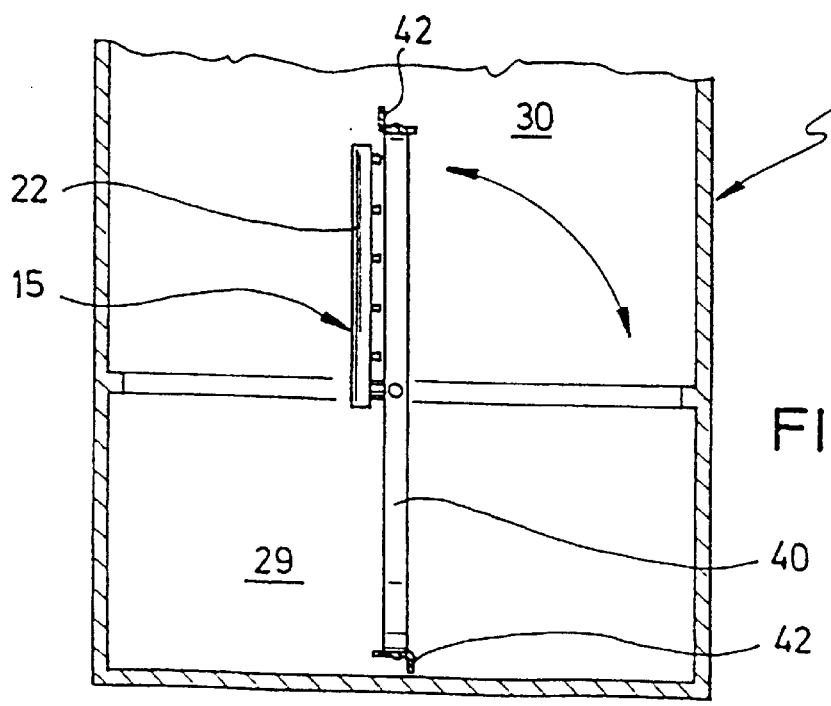

Turning now to FIGS. 8 and 9, there is shown an exemplified embodiment of the rotary bottom 40. As shown in FIG. 9, the rotary bottom 40 has stops and seals 42 which interact with a complimentary edge projecting outwards in the area of the bottom of the powder coating cabin 1, whereby the rotary bottom 40 supports only the scavenger arm 22. The remaining parts of the cleaning unit 15, which are designed independently from the rotary bottom 40 and are shown in FIG. 8 only schematically, are moved up and down by a schematically illustrated displacement device 17 in the vertical direction of the housing 3 for cleaning the interior space 30. After, conclusion of the cleaning procedure of the interior space 30, the rotary bottom 40 is pivoted back into its operative position, for example by about 180°, as indicated in FIG. 9 by double arrow 46, and the parts of the cleaning unit 15 utilized for realizing the internal cleaning operation are arranged in stand-by position underneath the rotary bottom 40 for permitting a cleansing in a manner described above inside the cleansing compartment 29 during spray coating operation.

Referring now to FIG. 10, there is shown is a schematic, partially sectional top plan view of the powder coating cabin 1, equipped with a first variation of a displacement device 17 for moving the cleaning unit 15 in a vertical direction of the housing 3, with the powder coating cabin 1 being provided with powder spray devices 43 which project through the longitudinal walls of the housing 3 via suitable bores. When opening the door-shaped gates 8, a respective pre-coating site 44 and a respective final coating site 45 are formed. FIG. 10 further shows the preferred arrangement of the exhaust ducts 9 in the area of the diametrically opposed longitudinal slits 10 in proximity of the pre-coating site 44 and/or the final coating site 45 for realizing a communication between the exhaust ducts 9 and the interior space 30 of the housing 30. The exhaust ducts 9 are thus arranged in diametrically opposite disposition and so associated especially to the pre-coating site 44 or the final coating site 45 that the longitudinal slits 10 approximately oppose one another in flow direction of the hand coating tool (not shown) when manual coating is carried out at the sites 44, 45 so that excess powder can be transferred to the exhaust ducts 9 in a reliable and rapid manner. The displacement device 17 is securely fixed externally to the housing 3 of the powder coating cabin 1, and the bar linkage 16 between the displacement device 17 and the cleaning unit 15 projects, for example, through the gap between the gates 8, as shown in FIG. 10 by broken lines. Alternatively, the displacement device 17 may also be secured to one of the door-shaped gates 8, as shown in FIG. 11.

Figure 12:
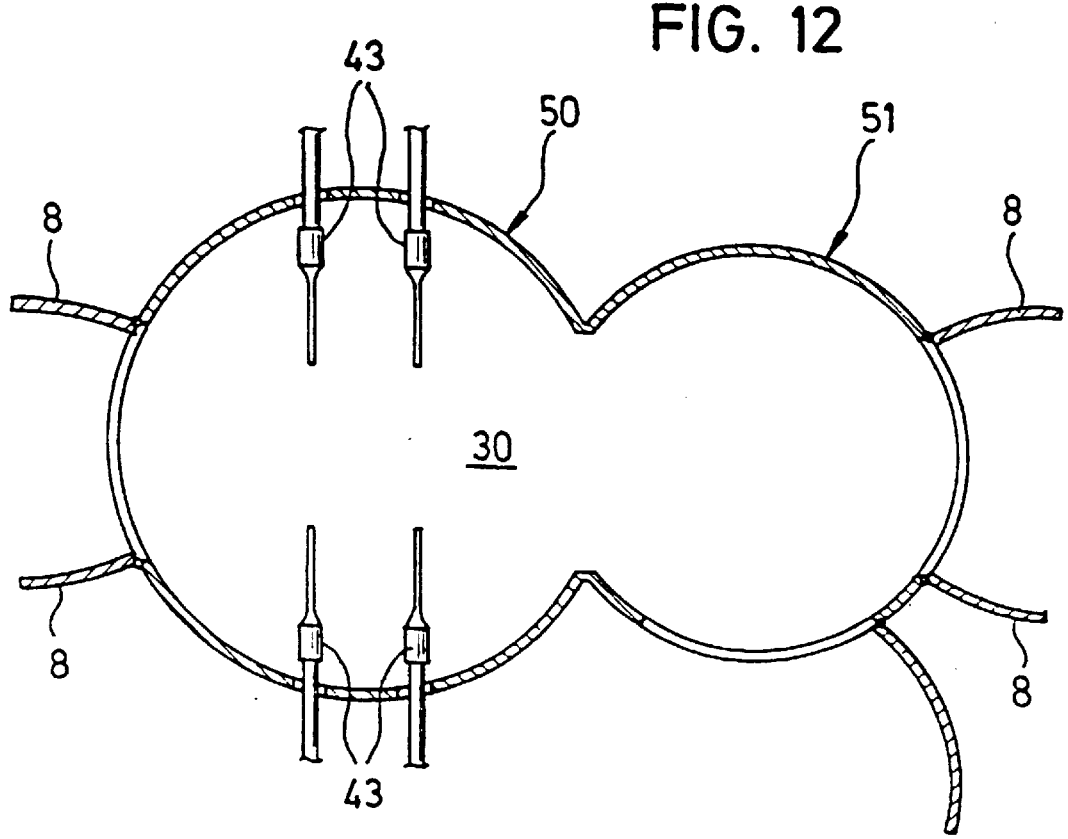
FIG. 12 is a schematic top plan view of an arrangement of two interconnected and successively arranged powder coating cabins.

Turning now to FIG. 12, there is shown a schematic top plan view of an arrangement of two interconnected and successively positioned powder coating cabins 50, 51, with the powder coating cabin 50 having an inner diameter which is greater than the inner diameter of the powder coating cabin 51. Advantageously, the powder coating cabin 51 may be utilized as a final coating unit and/or a pre-coating unit, with the automatically operated powder spray devices 43 being arranged in the powder coating cabin 50.

Figure 13:
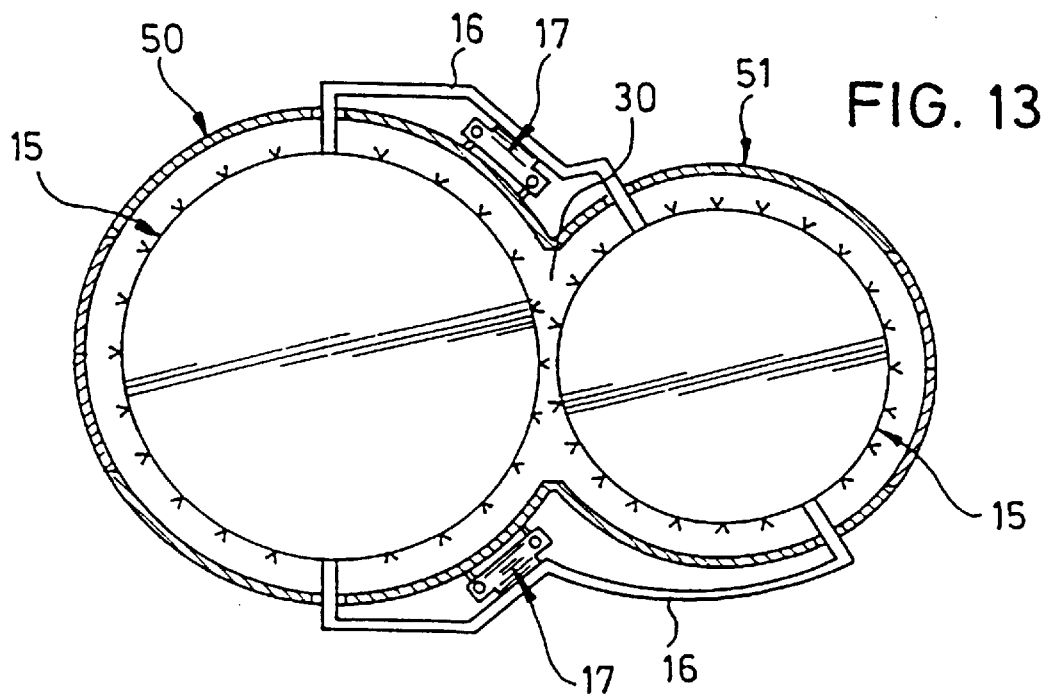
FIG. 13 is a schematic top plan view of the arrangement of the two powder coating cabins of FIG. 12, showing in detail the incorporation of a cleaning unit.

In FIG. 13, the powder coating cabins 50,51 are cleaned interiorly by separate cleaning units 15 which are dimensioned to suit the differences in size of the powder coating cabins 50, 51 and are moved up and down in vertical direction of the housing 3 by means of a common displacement device 17. Respective bar linkages 16 interconnect the displacement device 17 with both cleaning units 15, whereby the bar linkages 16 penetrate the housing 3 through the bores that accommodate the powder spray devices 43.

Figure 14:
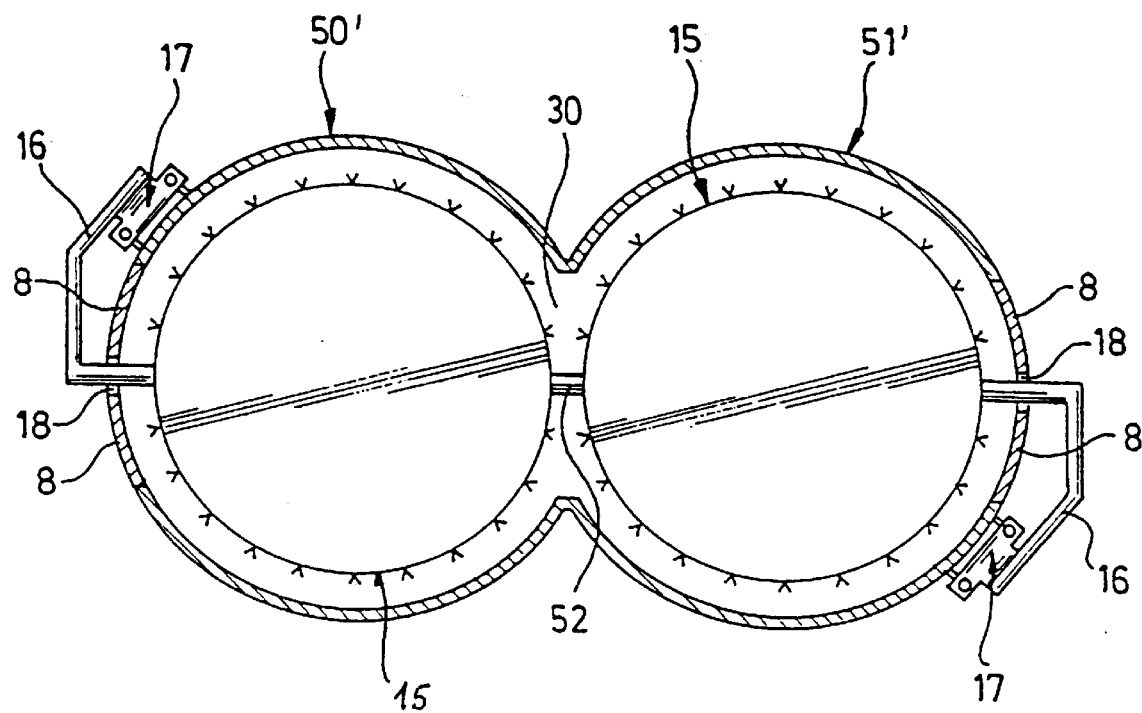
FIG. 14 is a schematic top plan view of an arrangement of two interconnected and successively arranged powder coating cabins of same internal dimensions, showing in detail the incorporation of a variation of cleaning unit.

FIG. 14 show a schematic top plan view of an arrangement of two interconnected and successively arranged powder coating cabins 50', 51' of same internal dimensions, with each powder coating cabin 50', 51' including a cleaning unit 15 which are securely interconnected in the transition area of both powder coating cabins 50', 51' by a linkage 52. The bar linkages 16 are arranged as mirror images to one another and respectively project through gaps 18 formed between the door-shaped gates 8 to connect the cleaning units 15 to the associated displacement devices 17.

While the invention has been illustrated and described as embodied in a powder coating cabin, it is not intended to be limited to the details shown since various modifications and structural changes may be made without departing in any way from the spirit of the present invention. For example, combinations of various embodiments of the cleaning units, cabin bottoms and displacement devices are certainly possible to best suit the powder coating cabin to the respective application.

What is claimed as new and desired to be protected by Letters Patent is set forth in the appended claims:

1. A powder coating cabin, comprising:

a housing defining an interior space between a ceiling and a bottom, said bottom being substantially of flat configuration;

a coating unit arranged on the housing for spraying powder onto an object, and a cleaning unit for cleaning inner wall surfaces of the housing, wherein the cleaning unit is so received in the housing as to be movable between a stand-by position and an operative phase, said cleaning unit being arranged at least partially underneath the bottom in the stand-by position.

2. The powder coating cabin of claim 1 wherein the cleaning unit is received in the housing for inside cleaning the interior space of the housing.

3. A powder coating cabin, comprising:

a housing defining an interior space between a ceiling and a bottom, said bottom being substantially of flat configuration;

a coating unit arranged on the housing for spraying powder onto an object, and a cleaning unit for cleaning inner wall surfaces of the housing, wherein the bottom is so designed as to clear a passage for the cleaning unit.

4. A powder coating cabin, comprising:

a housing defining an interior space between a ceiling and a bottom, said bottom being substantially of flat configuration;

a coating unit arranged on the housing for spraying powder onto an object, and a cleaning unit for cleaning inner wall surfaces of the housing, wherein the cleaning unit is so designed as to be adjustable in a vertical direction of the housing for automatically cleaning at least the inside wall surfaces of the housing, said coating unit including a spray coating device projecting into the interior space through at least one slot in the housing, a pre-coating site secured to the housing and having a gate mechanism movable between a first position in which access to the interior space is closed and a second position in which access to the interior space is open to allow pre-coating of the object, and a final coating site secured to the housing and having a gate mechanism movable between a first position in which access to the interior space is closed and a second position in which access to the interior space is open to allow final coating of the object.

5. The powder coating cabin of claim 4 wherein the slot is closeable.

6. A powder coating cabin, comprising:

a housing defining an interior space between a ceiling and a bottom, said bottom being substantially of flat configuration;

a coating unit arranged on the housing for spraying powder onto an object, and a cleaning unit for cleaning inner wall surfaces of the housing, wherein the cleaning unit has a scavenger arm adapted to sweep over the bottom during operation of the coating unit, and a cleaning member adapted for cleaning the inside wall surfaces of the interior space.

7. The powder coating cabin of claim 6 wherein the scavenger arm is provided with at least one element selected from the group consisting of scraper, scraping lip and arrays of blow nozzles.

8. The powder coating cabin of claim 7 wherein one of the arrays of blow nozzles is provided for realizing a cleaning of the ceiling in the operative phase of the cleaning unit.

9. The powder coating cabin of claim 1 wherein the cleaning unit is so adapted as to spin about a substantially vertical axis.

10. A powder coating cabin, comprising:

a housing defining an interior space between a ceiling and a bottom, said bottom being substantially of flat configuration; and a coating unit arranged on the housing for spraying powder onto an object, wherein the housing has at least one slit extending longitudinally along a vertical extension of the housing between the ceiling and the bottom, and further comprising at least one exhaust duct connected to the interior space of the housing via the slit.

11. The powder coating cabin of claim 10, and further comprising a cleaning unit for cleaning the interior space of the housing.

12. The powder coating cabin of claim 10 wherein the housing has two such slits extending longitudinally along a vertical extension of the housing in diametrically opposite disposition, and further comprising two such exhaust ducts in diametrically opposite disposition, one of the exhaust ducts being connected to the interior space of the housing via one of the slits, and the other one of the exhaust ducts being connected to the interior space of the housing via the other one of the slits.

13. The powder coating cabin of claim 4 wherein the housing has two slits extending longitudinally along a vertical extension of the housing between the ceiling and the bottom in diametrically opposite disposition, and further comprising two exhaust ducts in diametrically opposite disposition adjacent the pre-coating and final coating sites, one of the exhaust ducts being connected to the interior space of the housing via one of the slits, and the other one of the exhaust ducts being connected to the interior space of the housing via the other one of the slits.

14. The powder coating cabin of claim 10 wherein the slit has a width which decreases from the bottom in direction to the ceiling.

15. The powder coating cabin of claim 10 wherein the cleaning unit has an auxiliary device for automatically cleaning the exhaust duct.

16. The powder coating cabin of claim 12, and further comprising a cyclone having an inlet port, and a duct system connected to the cyclone and uniting the exhaust ducts to one another downstream of the inlet port of the cyclone.

17. The powder coating cabin of claim 16 wherein the duct system forms an acceleration path.

18. A powder coating cabin, comprising:
a housing defining an interior space between a ceiling and a bottom, said bottom being substantially of flat configuration;
a coating unit arranged on the housing for spraying powder onto an object, and
a cleaning unit for cleaning inner wall surfaces of the housing, wherein the housing has a cleansing compartment underneath the bottom for accommodating the cleaning unit in the stand-by position and allowing a purifying of the cleaning unit.

19. The powder coating cabin of claim 18, and further comprising at least one first conduit connected to the cleansing compartment for supply of air and at least one second conduit connected to the cleansing compartment for exhaust of air.

20. The powder coating cabin of claim 19, and further comprising a fan for feeding a large amount of air through the first conduit into the cleansing compartment.

21. The powder coating cabin of claim 20, and further comprising a cyclone having an outlet for discharge of exhaust air into the first conduit; and a filter positioned downstream of the cyclone outlet.

22. The powder coating of claim 18 wherein the cleaning unit has a scavenger arm adapted to sweep over the bottom during operation of the coating unit, said cleaning unit together with the scavenger arm being arranged in its entirety within the cleansing compartment.

23. The powder coating cabin of claim 1, and further comprising an exhaust system positioned in the area of the ceiling.

24. The powder coating cabin of claim 23 wherein the ceiling is formed with a slotted opening for allowing entry into and continuous advance of an overhead transported object through the housing, said ceiling being formed with an annular gap for fluidly connecting the interior space with the exhaust system when the slotted opening is closed.

25. The powder coating cabin of claim 23 wherein the ceiling is formed with a slotted opening for allowing entry into and continuous advance of an overhead transported object through the housing, said exhaust system being fluidly connected to the interior space via the slotted opening.

26. A powder coating cabin, comprising:
a housing defining an interior space between a ceiling and a bottom, said bottom being substantially of flat configuration;
a coating unit arranged on the housing for spraying powder onto an object, and
a cleaning unit for cleaning inner wall surfaces of the housing, wherein the bottom is of split configuration and formed by two bottom portions which are capable of traveling apart from one another to open the bottom and to allow passage of the cleaning unit for carrying out a cleaning of the inside wall surfaces of the housing.

27. A powder coating cabin, comprising:
a housing defining an interior space between a ceiling and a bottom, said bottom being substantially of flat configuration;
a coating unit arranged on the housing for spraying powder onto an object, and
a cleaning unit for cleaning inner wall surfaces of the housing, wherein the bottom is of single-piece configuration and adapted for withdrawal in its entirety to allow passage of the cleaning unit for carrying out cleaning of the inside wall surfaces of the interior space.

28. A powder coating cabin, comprising:
a housing defining an interior space between a ceiling and a bottom, said bottom being substantially of flat configuration; and
a coating unit arranged on the housing for spraying powder onto an object,
wherein the bottom is formed as rotary bottom.

29. A powder coating cabin, comprising:
a housing defining an interior space between a ceiling and a bottom, said bottom being substantially of flat configuration; and
a coating unit arranged on the housing for spraying powder onto an object,
wherein the bottom is formed as rotary bottom, said cleaning unit being mounted to the rotary bottom, said rotary bottom being so designed as to be adjustable in a vertical direction of the housing for automatically cleaning the inside wall surfaces of the housing.

30. The powder coating cabin of claim 28 wherein the bottom is formed as rotary bottom, said cleaning unit and said rotary bottom being so designed as to be adjustable in a vertical direction independently from one another.

31. The powder coating cabin of claim 4, and further comprising a displacement device for vertically adjusting the cleaning unit between the bottom and the ceiling, said displacement device being mounted externally onto the housing and operatively connected to the cleaning unit via the slot for passage of the spray coating device.

32. The powder coating cabin of claim 4, and further comprising a displacement device for vertically adjusting the cleaning unit between the bottom and the ceiling, said displacement device being mounted externally onto one of the gate mechanisms and operatively connected to the cleaning unit via a slot formed in said one gate mechanism.

33. The powder coating cabin of claim 3 wherein the cleaning unit is of ring-shaped configuration.

34. The powder coating cabin of claim 3 wherein the cleaning unit includes at least one element selected from the group consisting of scraper members, blow nozzles, brushes, sponge and wet cleaning units.

35. In combination:
  a first powder coating cabin, comprising a housing defining an interior space between a ceiling and a bottom, said bottom being substantially of flat configuration, a coating unit arranged on the housing for spraying powder onto an object, a cleaning unit for cleaning inner wall surfaces of the housing,
  a second said powder coating cabin destined for connection in succession to the first powder coating cabin; and
  a common displacement device for vertically adjusting the cleaning unit of each of said first and second powder coating cabins.

36. The combination of claim 35 wherein both powder coating cabins have different dimensions.

37. The combination of claim 35 wherein both powder coating cabins have same internal dimensions, with the cleaning unit of one powder coating cabin and the cleaning unit of the other powder coating cabin being securely attached to one another in a transition zone between both powder coating cabins.

38. The combination of claim 35 wherein the displacement device interacts with the cleaning unit of each powder coating cabin.

39. The combination of claim 35 wherein the displacement device is a mechanism selected from the group consisting of rope drive, spindle drive and chain drive.

40. The powder coating cabin of claim 3 wherein the cleaning unit is received in the housing for inside cleaning the interior space of the housing.

41. The powder coating cabin of claim 3 wherein the cleaning unit is so adapted as to spin about a substantially vertical axis.

42. The powder coating cabin of claim 3, and further comprising an exhaust system positioned in the area of the ceiling.

43. The powder coating cabin of claim 3 wherein the cleaning unit is of ring-shaped configuration.

44. The powder coating cabin of claim 3 wherein the cleaning unit includes at least one element selected from the group consisting of scraper members, blow nozzles, brushes, sponge and wet cleaning units.

45. The powder coating cabin of claim 4 wherein the cleaning unit is received in the housing for inside cleaning the interior space of the housing.

46. The powder coating cabin of claim 4 wherein the cleaning unit is so adapted as to spin about a substantially vertical axis.

47. The powder coating cabin of claim 4, and further comprising an exhaust system positioned in the area of the ceiling.

48. The powder coating cabin of claim 4 wherein the cleaning unit is of ring-shaped configuration.

49. The powder coating cabin of claim 4 wherein the cleaning unit includes at least one element selected from the group consisting of scraper members, blow nozzles, brushes, sponge and wet cleaning units.

50. The powder coating cabin of claim 6 wherein the cleaning unit is received in the housing for inside cleaning the interior space of the housing.

51. The powder coating cabin of claim 6 wherein the cleaning unit is so adapted as to spin about a substantially vertical axis.

52. The powder coating cabin of claim 6, and further comprising an exhaust system positioned in the area of the ceiling.

53. The powder coating cabin of claim 6 wherein the cleaning unit is of ring-shaped configuration.

54. The powder coating cabin of claim 6 wherein the cleaning unit includes at least one element selected from the group consisting of scraper members, blow nozzles, brushes, sponge and wet cleaning units.

55. The powder coating cabin of claim 11 wherein the cleaning unit is received in the housing for inside cleaning the interior space of the housing.

56. The powder coating cabin of claim 11 wherein the cleaning unit is so adapted as to spin about a substantially vertical axis.

57. The powder coating cabin of claim 11, and further comprising an exhaust system positioned in the area of the ceiling.

58. The powder coating cabin of claim 11 wherein the cleaning unit is of ring-shaped configuration.

59. The powder coating cabin of claim 11 wherein the cleaning unit includes at least one element selected from the group consisting of scraper members, blow nozzles, brushes, sponge and wet cleaning units.

60. The powder coating cabin of claim 18 wherein the cleaning unit is received in the housing for inside cleaning the interior space of the housing.

61. The powder coating cabin of claim 18 wherein the cleaning unit is so adapted as to spin about a substantially vertical axis.

62. The powder coating cabin of claim 18, and further comprising an exhaust system positioned in the area of the ceiling.

63. The powder coating cabin of claim 18 wherein the cleaning unit is of ring-shaped configuration.

64. The powder coating cabin of claim 18 wherein the cleaning unit includes at least one element selected from the group consisting of scraper members, blow nozzles, brushes, sponge and wet cleaning units.

65. The powder coating cabin of claim 26 wherein the cleaning unit is received in the housing for inside cleaning the interior space of the housing.

66. The powder coating cabin of claim 26 wherein the cleaning unit is so adapted as to spin about a substantially vertical axis.

67. The powder coating cabin of claim 26, and further comprising an exhaust system positioned in the area of the ceiling.

68. The powder coating cabin of claim 26 wherein the cleaning unit is of ring-shaped configuration.

69. The powder coating cabin of claim 26 wherein the cleaning unit includes at least one element selected from the group consisting of scraper members, blow nozzles, brushes, sponge and wet cleaning units.

70. The powder coating cabin of claim 27 wherein the cleaning unit is received in the housing for inside cleaning the interior space of the housing.

71. The powder coating cabin of claim 27 wherein the cleaning unit is so adapted as to spin about a substantially vertical axis.

72. The powder coating cabin of claim 27, and further comprising an exhaust system positioned in the area of the ceiling.

73. The powder coating cabin of claim 27 wherein the cleaning unit is of ring-shaped configuration.

74. The powder coating cabin of claim 27 wherein the cleaning unit includes at least one element selected from the group consisting of scraper members, blow nozzles, brushes, sponge and wet cleaning units.

75. The powder coating cabin of claim 28, and further comprising a cleaning unit for cleaning the interior space of the housing.

76. The powder coating cabin of claim 75 wherein the cleaning unit is received in the housing for inside cleaning the interior space of the housing.

77. The powder coating cabin of claim 75 wherein the cleaning unit is so adapted as to spin about a substantially vertical axis.

78. The powder coating cabin of claim 75, and further comprising an exhaust system positioned in the area of the ceiling.

79. The powder coating cabin of claim 75 wherein the cleaning unit is of ring-shaped configuration.

80. The powder coating cabin of claim 75 wherein the cleaning unit includes at least one element selected from the group consisting of scraper members, blow nozzles, brushes, sponge and wet cleaning units.

81. The powder coating cabin of claim 29 wherein the cleaning unit is received in the housing for inside cleaning the interior space of the housing.

82. The powder coating cabin of claim 29 wherein the cleaning unit is so adapted as to spin about a substantially vertical axis.

83. The powder coating cabin of claim 29, and further comprising an exhaust system positioned in the area of the ceiling.

84. The powder coating cabin of claim 29 wherein the cleaning unit is of ring-shaped configuration.

85. The powder coating cabin of claim 29 wherein the cleaning unit includes at least one element selected from the group consisting of scraper members, blow nozzles, brushes, sponge and wet cleaning units.

* * * * *